United States Patent [19]

McGeehin

[11] Patent Number: 6,045,037
[45] Date of Patent: Apr. 4, 2000

[54] COLLAPSIBLE CONTAINER

[75] Inventor: Robert McGeehin, Leeds, United Kingdom

[73] Assignee: Rexam Plastic Packaging Limited, United Kingdom

[21] Appl. No.: 09/147,603
[22] PCT Filed: Aug. 4, 1997
[86] PCT No.: PCT/GB97/02065
 § 371 Date: Feb. 1, 1999
 § 102(e) Date: Feb. 1, 1999
[87] PCT Pub. No.: WO98/05562
 PCT Pub. Date: Feb. 12, 1998

[30] Foreign Application Priority Data

Aug. 6, 1996 [GB] United Kingdom .................... 9616515

[51] Int. Cl.[7] ........................................................ B65D 5/42
[52] U.S. Cl. ................................ 229/125.39; 229/125.37
[58] Field of Search .......................... 229/125.37, 125.39, 229/125.41, 136

[56] References Cited

U.S. PATENT DOCUMENTS

| | | | |
|---|---|---|---|
| 1,301,310 | 4/1919 | Paroubek | 229/125.41 |
| 2,063,999 | 12/1936 | Harrison | 229/125.39 |
| 2,348,551 | 5/1944 | LaPlace | 229/125.41 |
| 2,682,423 | 6/1954 | Ashworth | 229/125.39 |
| 2,688,507 | 9/1954 | Ashworth | 229/125.39 |
| 3,306,521 | 2/1967 | Giacovas | 229/136 |
| 3,325,084 | 6/1967 | Ausnit | 229/125.37 |
| 4,034,909 | 7/1977 | Toda . | |
| 4,333,602 | 6/1982 | Geschwender . | |
| 4,556,167 | 12/1985 | Fox et al. . | |

*Primary Examiner*—Gary E. Elkins
*Attorney, Agent, or Firm*—Hoffman, Wasson & Gitler

[57] ABSTRACT

A collapsible container made from card, board or like stiff material has its openings closable by means of pairs of overlapping flaps projecting from the free borders of its side walls. In order to permit the flaps to be separated from each other, to permit the container to be flattened after having been emptied, and for the container to be reerected without the use of any additional material, such as adhesive tape, the restrictive surfaces of the flaps have secured to them flat two-component non-adhesive couplings. Suitable couplings are those made from hooked- and looped-pile fabric, such as those sold under the trademark Velcro.

5 Claims, 1 Drawing Sheet

COLLAPSIBLE CONTAINER

This invention relates to containers, and particularly to so-called "cardboard" containers made from either stiff card, or from cardboard. However, the invention may be applied to cubic containers made from any suitable stiff material.

When such containers are designed to hold a matrix of other containers, such as for foodstuffs, the base of the container is usually made from two pairs of folded-over flaps, of which the outer pair have their adjacent borders secured together by means of strips of broad adhesive tape. After the container has been filed, it is closed by the upper flaps being folded over into overlapping contact, and their adjacent major borders are similarly secured together by adhesive tape. When the container is to be emptied, the adhesive tape is either wrenched off or cut, to enable the pairs of flaps to be folded back to give access to the contents of the outer container. After it has been emptied, if it is to be reused or recycled, the adhesive tape has to be removed, which is a messy and time-consuming operation.

The present invention aims at providing outer containers of which the overlapping flaps are secured together without the use of adhesive tape, to permit an opened-up and empty container to be collapsed flat and placed in a stack with like flattened containers for transport to a filling station, at which each container is reerected into its cubic shape without the use of any additional material.

GB-A-2,169,587 discloses a container having a bottom and four side walls. The resultant open top is intended to be closed by causing a long flap to engage two small side flaps to hold the other long flap in place. This container uses the same type of non-adhesive couplings as do containers of the present invention. However, in this disclosure, the flaps provided with the couplings are kept spaced from each other by the thickness of the intervening flap, which militates against the mechanical integrity of the coupling. In addition, this container is inherently not collapsible, because the bottom does not use the same type of couplings to hold it together.

U.S. Pat. No. 4,034,909 does disclose a collapsible container, but one which uses non-adhesive couplings only on its "top" flaps. Although its base is formed of overlapping flaps, these are intended to be held together by connectors having projecting lock tongues. The latter are intended to be pushed through aligned openings in the pairs of overlapping flaps, and their internal ends to be clinched to secure the flaps together. Dismantling the bottom of the container would be tedious and time-consuming, because it would entail straightening out each of the flattened tongues to permit the connector to be withdrawn, which is not a practicable solution.

U.S. Pat. No. 4,333,602 also uses a non-adhesive coupling on just two flaps intended to close the single opening of the container. These is no disclosure of the base of the container using the same type of coupling, so that the container is inherently not collapsible and reusable.

SUMMARY OF THE INVENTION

The present invention provides a box reliant upon two part fasteners, applied to the flaps at both ends of the box, for forming a sturdy container that may be collapsed, and reused, several times. The strategic location of the two-part fasteners enables the box to be reused and/or recycled several times, in contrast to known containers and/or boxes, which are usually discarded after a single use. Furthermore, the instant box retains its shape and appearance over an extended period of time, and finds particular utilization for retaining packaged foodstuffs.

The ability of the instant container to be reused several times, and be collapsed completely between uses to save storage space, particularly when several collapsed boxes are stored on top of one another, enhances the commercial appeal of the container.

The two-part fasteners may be fabricated from Velcro, or other hook and loop fasteners, of sufficient locking strength to insure the integrity of the erected box. The two-part fasteners obviate the need for adhesives to seal the flaps closed. Adhesives, either in the form of an externally applied tape or in the form of glue applied to contacting surfaces, create a semi-permanent, or permanent, bond that prevents the assembled box from being collapsed readily and recycles for repeated use. The adhesive must be removed, as by cutting, before conventional boxes can be collapsed.

The two-part fasteners are applied to the flaps hingedly connected to all of the sidewalls of the box of the present invention, as intended to be stacked vertically, with their flaps forming two opposite sidewalls of the stack, so that access to the contents of each box may be achieved while the boxes are still stacked. To permit such access, the present invention provides a way of securing the flaps together to resist the static force exerted on the flaps by the content of each box. This feature assumes added importance when the box is bearing the weight of several superimposed boxes filled with foodstuffs or other products.

Yet other advantages of the instant collapsible box will become readily apparent to the skilled artisan when the ensuing drawings are construed in accordance with the accompanying drawings.

BRIEF DESCRIPTION OF THE DRAWINGS

The present invention will now be described by way of example with reference to the accompanying drawing, in which.

DETAILED DESCRIPTION OF THE INVENTION

Figure 1:
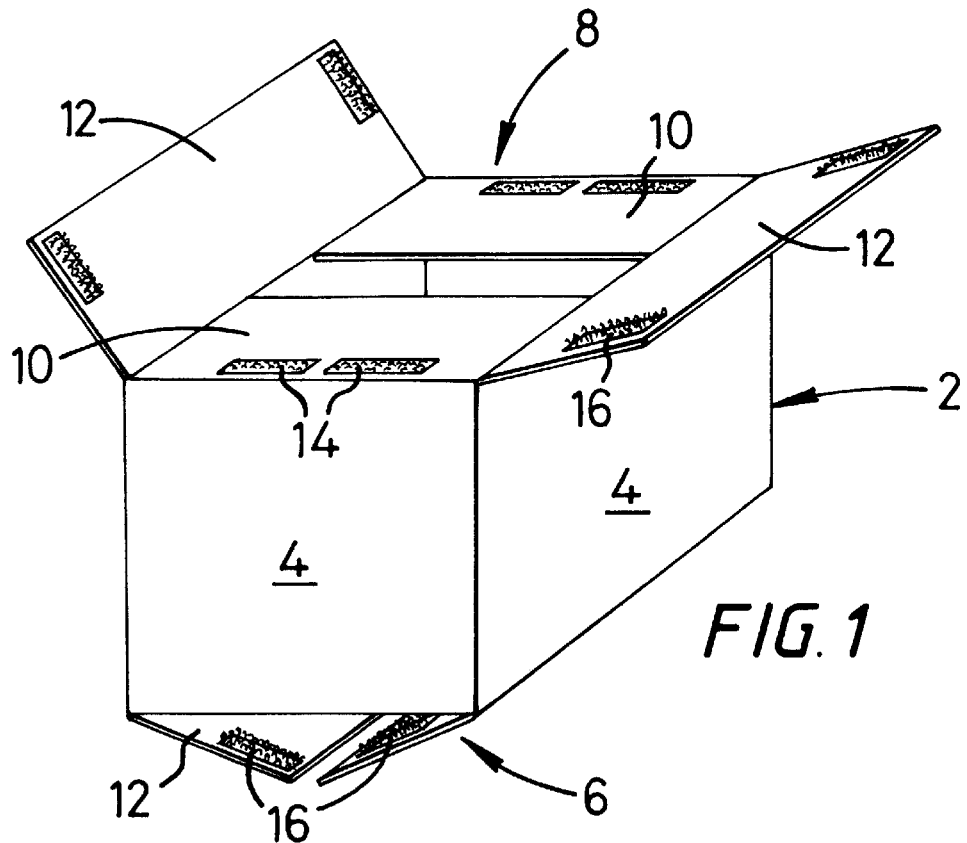
FIG. 1 is an isometric view of one form of container of the present invention, with its flaps in an intermediate position.

The container 2 is made from card, cardboard or suitable plastics material. It is shown in its loading position, with continuous upright sidewalls 4 and with its base 6 and top 8 being made from two pairs of overlapping flaps, consisting of a pair of inner flaps 10 and a pair of outer flaps 12. Before the container is filled, the inner flaps for the base are folded over into coplanar positions and the outer flaps are pressed against the contacting surfaces of the inner flaps to secure them together. After the container has been filled, the top 8 is closed in similar fashion.

In accordance with this invention, the contacting surfaces of the overlapping flaps are held together without adhesive, by making use of two-component flap couplings, of which each component may be secured permanently to its respective flap by means of an adhesive. One suitable coupling is that sold under the trademark "Velcro," of which each component is made from fabric. One component presents a looped pile, while the other presents a hooked pile. When the two components are pressed together, the hooks engage the loops to hold them together in a firm grip, which may be loosened and released by pulling the two components apart. They are not damaged by repeated application and separation, as long as the grip between them is less than the force by which the adhesive holds them against their supports.

It is preferable for the looped components 14 to be secured to the inner flaps 10 adjacent to the hinged border of the respective flap, and for the hooked components 16 to be secured to the outer flaps 12 in matching positions close to the respective free border of the flap. When the container has been filled, the contents provide an "anvil" against which the inner flaps can be pressed by the outer flaps to ensure that the couplings are securely engaged.

When the containers of the present invention are used to hold and transport small contains ("boxes") of foodstuffs, it is usual to load each container in horizontal layers. Each layer is made up of many parallel short stacks of boxes, laid on their sides. The boxes are usually nested, so that the base of one box fits within the borders of the lid of the underlying box. When the container has been filled and closed as described above, the container is turned through 90° to its working position, so that one of its former side walls becomes the base. The side wall chosen to act as the base is related to the orientation of the stacked boxes, so that the boxes within the container are stacked vertically with their lids uppermost. In practice, many containers would themselves be stacked on a pallet for storage and transport. Changing the orientation of the filled containers means that the unsupported outer faces of the stacked containers are made of cooperating pairs of flaps coupled together by the non-adhesive fastenings. When several filled containers are stacked on top of each other, the weight of the superposed containers causes the flaps of the underlying containers to flex, applying force to the couplings to cause them to slide relatively to each other. These forces are reduced by positioning the fastening components close to the hinge lines of the respective inner flaps, and positioning the components on the outer flaps accordingly. Although FIG. 1 shows there as being two lengths of looped components 14 on each inner flap, both could be replaced by a single-piece, double length, component intended to cooperate with two hooked components 16.

Figure 2:
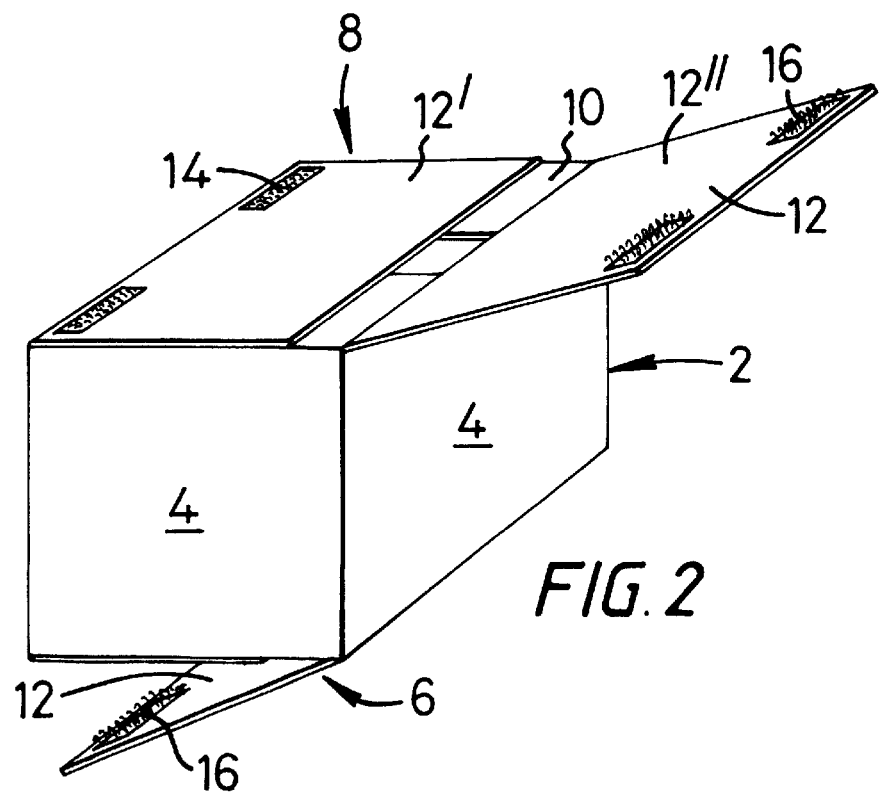
FIG. 2 is a similar view of another form of container of this invention.

In that embodiment of the invention shown in FIG. 2, the outer flaps 12 are intended to overlap each other, and not merely lie in the same plane. To ensure that the two flaps lie parallel to each other, the flaps are not completely identical to each other, in that each pair, one flap 12' of the pair is designated the inner flap, while the other flat 12" is designated the outer flap, indicating the sequence in which they are folded into position. Flap 12" has its hinge line displaced by the thickness of the flap from that for flap 12'. In this way, the outer flap 12" comes to lie against inner flap 12', thus ensuring that the coupling components can engage fully.

When a filled container has been emptied, it may be collapsed easily by gripping the respective outer flap and pulling it away from the inner flap with sufficient force to cause the coupling components to lose their grip on each other, but without pulling the component off its respective flap. When both "open" ends have had their flaps separated from each other in this way, the boxes may be folded flat by causing the two pairs of side walls 4 to be flattened together, with their respective flaps lying in the same plane as the side walls. Reerection of a collapsed container is a simple matter of forming the side walls into a rectangle, and successively coupling the cooperating pairs of flaps together as already described.

When the couplings are made from plastics pieces intended to be latched together, it might be desirable to ensure that one type of component is always secured to the inner flaps, and the cooperating type to the outer flaps, but whether this is necessary or not has usually to be determined by experimentation.

Accordingly, it will be seen that this invention provides a convenient way of ensuring that cubic containers may be reused repeatedly without the use of adhesive tape or of any connector for holding the cooperating flaps securely together.

What is claimed is:

1. A closable collapsible container made with stiff card, cardboard or suitable plastics material, the container having two pairs of side walls intended when erected to form four sides of an enclosed space and two end openings into said space, in which each side wall has projecting from it two flaps each hinged about a line forming an edge of the side wall, in which each of the openings of the container is intended to be securely closed by an inner cooperating pair of the flaps and an outer cooperating lair of the flaps and by two-part separable non-adhesive couplings, in which the inner flaps have on their outer surfaces, near the hinge line, the first parts of the respective couplings, and in which the outer flaps have on their inner surfaces the other parts of the couplings in positions complementary to parts on the inner flaps, whereby the container may be erected and collapsed repeatedly without the use of adhesive tape and in which the coupling parts on the outer surface of each inner flap are positioned closely adjacent to, and parallel with, the hinge line of the respective flap, each pair of outer flaps covers virtually the whole area of the respective opening, without overlap, and the coupling parts on the inner surface of each outer flap are positioned in the corners thereof remote from the respective hinge line.

2. A container as claimed in claim 1, in which the couplings are of a fabric type, with one part comprising a hooked pile, and with the other part comprising a looped pile.

3. A container as claimed in claim 1, in which the couplings are made from moulded plastics material of which the two parts may be latched together.

4. A container as claimed in claim 1, in which the two flaps of each pair of flaps are intended to be substantially coplanar when the respective two pairs of flaps are coupled together.

5. A container as claimed in claim 4, in which the hinge lines for each outer pair of flaps are displaced by the thickness of the material of the flap from the hinge lines for each inner pair of flaps.

* * * * *